R. HIRSCH.
WAVE METER.
APPLICATION FILED MAR. 17, 1911. RENEWED JAN. 6, 1913.
1,064,325.
Patented June 10, 1913.
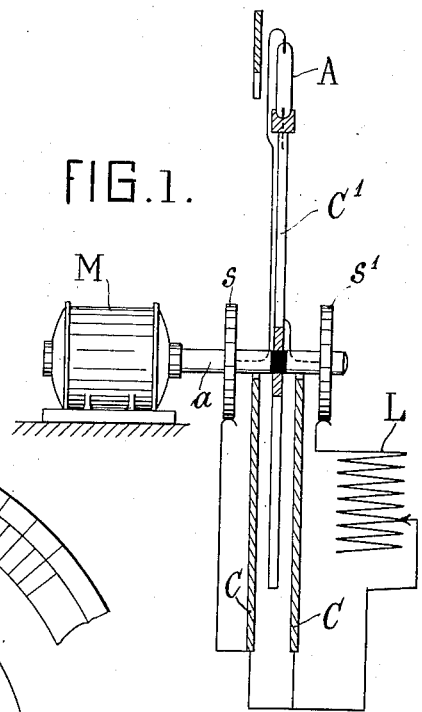
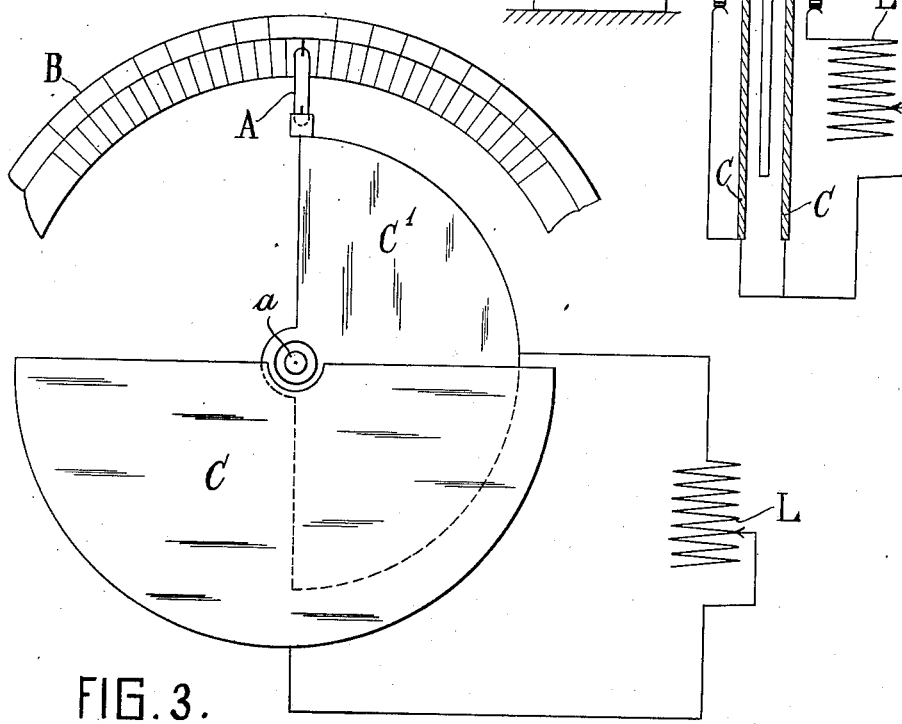
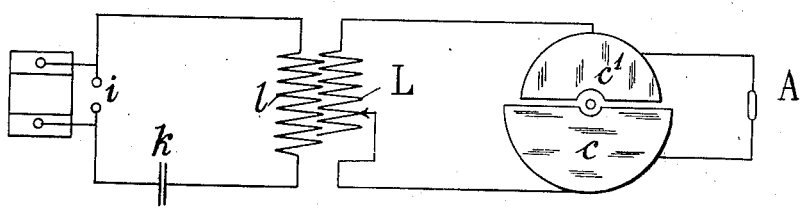
Witnesses:
Inventor
Richard Hirsch
by his Attorney

UNITED STATES PATENT OFFICE.

RICHARD HIRSCH, OF BERLIN, GERMANY, ASSIGNOR TO DR. ERICH F. HUTH, G. M. B. H., OF BERLIN, GERMANY.

WAVE-METER.

1,064,325.  Specification of Letters Patent.  Patented June 10, 1913.

Application filed March 17, 1911, Serial No. 615,012. Renewed January 6, 1913. Serial No. 740,547.

*To all whom it may concern:*

Be it known that I, RICHARD HIRSCH, subject of the German Emperor, residing at No. 25 Nollendorfstrasse, Berlin, Germany, have invented certain new and useful Improvements in Wave-Meters, of which the following is a specification.

Wave meters now in use are based upon the principle of resonance. In these meters the amount of capacity of self-induction of an oscillating circuit is varied until an indicator connected in the circuit shows a maximum current or voltage. As the wave length for each reading of the measuring circuit is known, the wave length of the primary circuit is also determined. Thus the determination of the wave length results, in every case, from the search for the position of resonance.

This invention relates to a wave meter which is also based on the principle of resonance but in which a search for the resonance position by hand is not necessary, and permits the direct reading of the frequency in a high frequency circuit as is the case in other instruments such as voltmeters etc.

The Figures 1 and 2 of the drawing show diagrammatically the arrangement according to the invention. Fig. 3 is another diagram of the wave meter circuit.

C C' is an adjustable condenser the part C being stationary and the part C' rotatable on the axis *a* driven by a motor M (Fig. 1). L is a self-induction, which is also capable of adjustment, and A a voltage indicator, such as a gas tube (as shown in the drawing) or a spark gap, which is connected in parallel with the self induction or capacity. This connection may be a direct one as effected in Fig. 1, for instance, by rotary sliding contacts S S' in connection with the conductors of the gas tube or indicator A; the latter is fixed to the rotatable part of the condenser and plays over a scale B (Fig. 2), otherwise the varying member of the self-induction should be connected with the indicator A. Of course, the said connection may also be indirect or capacitative.

Either the self-induction or the capacity, as the case may be, is the means for influencing or determining the frequency and this is effected in a varying degree by the quick revolution of the motor M. Thus it is obvious from Figs. 1 and 2 of the drawing that owing to the rotation of C' with respect to C, the capacity (or otherwise the self-induction) periodically passes through its range from the smallest to the highest values. Consequently, the resonance position would be passed during each revolution and the voltage indicator would indicate this each time. As this always happens in the same position, the resonance position would be continuously shown by a thin streak of light emitted by the indicator A. The gas tube moving over the scale B suitably calibrated in wave lengths permits the wave length or frequency to be read off directly.

In Fig. 3, a general diagram is shown of the connection of the wave meter circuit with the oscillatory circuit composed of an oscillatory or exciting gap *i*, condenser *k* and induction coil *l*. The advantage of this arrangement does not only reside in the direct reading of the wave length, but also in the result that this reading is more accurate than in other known methods.

The constancy of circuits, whose wave length is to be determined, is always subject to a certain oscillation, and in the manual adjustment of the resonance, the determination always depends on a personal capacity; different observers generally find a different resonance position. The use of the present invention, practically affords an automatic indication giving the average value of a large number of readings. The resonance position is not affected by variations in the exciting intensity which only result in a varying degree of brightness of the illuminated strip or indicator A. Small variations of wave length are shown by a widening out of the strip, while the median line of the strip serves as index to be read on the scale, this index involving the arithmetical mean of a considerable number of single values with great accuracy.

A further advantage of the invention is, that the width of the illuminated strip and the differences of intensity on it are indications for the actual damping in the primary circuit. The wider the strip and the lesser the differences of intensity on it, the greater the damping.

A further advantage of the invention arises, when it is necessary to ascertain whether an oscillation circuit contains one or more waves. If there are several waves, the harmonic oscillations as well as the fundamental oscillations can be read off the wave meter. Instead of an illuminated strip according to the number of harmonic oscillations, several illuminated marks will then be seen on the scale, the relations of which can be ascertained by the difference of their luminous intensity.

Having now particularly described and ascertained the nature of my said invention and in what manner the same is to be performed, I declare that what I claim and wish to secure by Letters Patent is:—

1. In a wave meter, the combination with an oscillating circuit variable periodically and continuously in its frequency, of an indicator electrically connected with said oscillating circuit and rotating in the period of the variation of the frequency, and means upon which indications given by said indicator may be read.

2. In a wave meter, the combination with a condenser having a rotary member provided with an indicator, of an inductance electrically connected with said indicator, means for rotating the rotary member of the condenser in relation to the fixed part thereof, and means upon which indications given by said indicator may be read.

3. In a wave meter, the combination with a condenser, including a fixed member and a rotary member provided with an indicator, of a motor upon the shaft of which the rotary condenser member is carried, an inductance electrically connected to said indicator, and a suitably calibrated scale upon which the indications given by said indicator may be read.

4. In a wave meter, the combination with a condenser having a rotary member provided with an indicator, of a motor upon the shaft of which the rotary condenser member is carried, contact members upon the motor shaft, an inductance, means by which the indicator is connected in parallel through said contact members with the inductance, and a scale upon which the indications given by said indicator may be read.

In testimony whereof I affix my signature in presence of two witnesses.

RICHARD HIRSCH.

Witnesses:
HENRY HASPER,
WOLDEMAR HAUPT.